(12) United States Patent
Iwamoto (10) Patent No.: US 12,482,180 B2
(45) Date of Patent: Nov. 25, 2025

(54) 3D MODEL GENERATION APPARATUS, GENERATION METHOD, AND STORAGE MEDIUM

(71) Applicant: CANON KABUSHIKI KAISHA, Tokyo (JP)

(72) Inventor: Shohei Iwamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 18/494,896

(22) Filed: Oct. 26, 2023

(65) Prior Publication Data
US 2024/0144592 A1 May 2, 2024

(30) Foreign Application Priority Data
Nov. 2, 2022 (JP) ................. 2022-176766

(51) Int. Cl.
G06T 17/00 (2006.01)
G06T 7/20 (2017.01)
G06T 7/70 (2017.01)

(52) U.S. Cl.
CPC ............. *G06T 17/00* (2013.01); *G06T 7/20* (2013.01); *G06T 7/70* (2017.01)

(58) Field of Classification Search
None
See application file for complete search history.

(56) References Cited

U.S. PATENT DOCUMENTS

| | | | |
|---|---|---|---|
| 2005/0018045 A1 | 1/2005 | Thomas | |
| 2014/0295924 A1* | 10/2014 | Nicora | A63B 71/0619 463/3 |
| 2014/0301601 A1* | 10/2014 | Marty | G06T 7/80 382/103 |
| 2019/0340777 A1 | 11/2019 | Takama | |
| 2020/0202545 A1 | 6/2020 | Maruyama | |
| 2023/0036888 A1* | 2/2023 | Pennacchia | A63B 69/3658 |
| 2023/0162437 A1* | 5/2023 | Ito | G06V 20/64 345/419 |

FOREIGN PATENT DOCUMENTS

JP 2020-101845 A 7/2020

OTHER PUBLICATIONS

Extended European Search Report issued by the European Patent Office on Jun. 20, 2024 in corresponding EP Patent Application No. 23206616.7.7.

* cited by examiner

*Primary Examiner* — Frank S Chen (74) *Attorney, Agent, or Firm* — Carter, DeLuca & Farrell LLP (57) ABSTRACT

A 3D model representing a three-dimensional shape of an object existing in an area in which image capturing areas overlap is generated by using a plurality of moving images obtained by a plurality of imaging devices. Then, in a case where the object corresponding to the generated 3D model goes out of the area, a velocity vector at the time of the object crossing a border of the area is calculated. Then, based on the calculated velocity vector and the position at the time of the object crossing the border of the area, the position of the object after the object goes out of the area is estimated. Further, a 3D model representing a three-dimensional shape of the object at the estimated position is estimated.

16 Claims, 6 Drawing Sheets

3D MODEL GENERATION APPARATUS, GENERATION METHOD, AND STORAGE MEDIUM

FIELD

The present disclosure relates to a technique to generate a 3D model of an object.

DESCRIPTION OF THE RELATED ART

There is a technique to generate a virtual viewpoint image from an arbitrary virtual viewpoint by using captured images from multiple viewpoints obtained by synchronous image capturing of a plurality of imaging devices. It is possible to implement the generation of a virtual viewpoint image by, for example, generating three-dimensional shape data (3D model) of an object captured in captured images from multiple viewpoints by the visual hull method or the like and performing rendering in accordance with a virtual viewpoint. In this case, in order to generate a 3D model, it is necessary for an object to be captured in each of captured images from multiple viewpoints.

Japanese Patent Laid-Open No. 2020-101845 has described a technique to suppress the shape of a 3D model of an object of interest from being distorted and the contour thereof from becoming lost in a case where the object of interest is hidden by the shadow of another object from the viewpoint of one of the imaging devices.

For example, in ball game sports such as baseball, there is a case where the ball as an object goes up higher than expected and goes out of the generation area of a 3D model (for example, an image capturing area covered by a plurality of imaging devices). In the case such as this where the object goes out of the generation area of a 3D model, it is not possible even for the technique of Japanese Patent Laid-Open No. 2020-101845 described above to deal with the situation, and therefore, the generation of a 3D model stops. As a result of that, for example, during viewing, an unnatural virtual viewpoint image is generated, in which the ball having been captured until that point in time disappears suddenly.

SUMMARY

The generation apparatus according to the present disclosure includes: one or more memories storing instructions; and one or more processors executing the instructions to perform: generating a 3D model representing a three-dimensional shape of an object existing in an area in which image capturing areas of a plurality of imaging devices overlap by using a plurality of moving images obtained by the plurality of imaging devices capturing images of the object; calculating, in a case where the object corresponding to the generated 3D model goes out of the area, a first velocity vector at the time of the object crossing a border of the area; estimating a position of the object after the object goes out of the area based on the calculated first velocity vector and a position at the time of the object crossing the border of the area; and estimating a 3D model representing a three-dimensional shape of the object at the estimated position by associating a duplicate of the generated 3D model with the estimated position.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Figure 1:
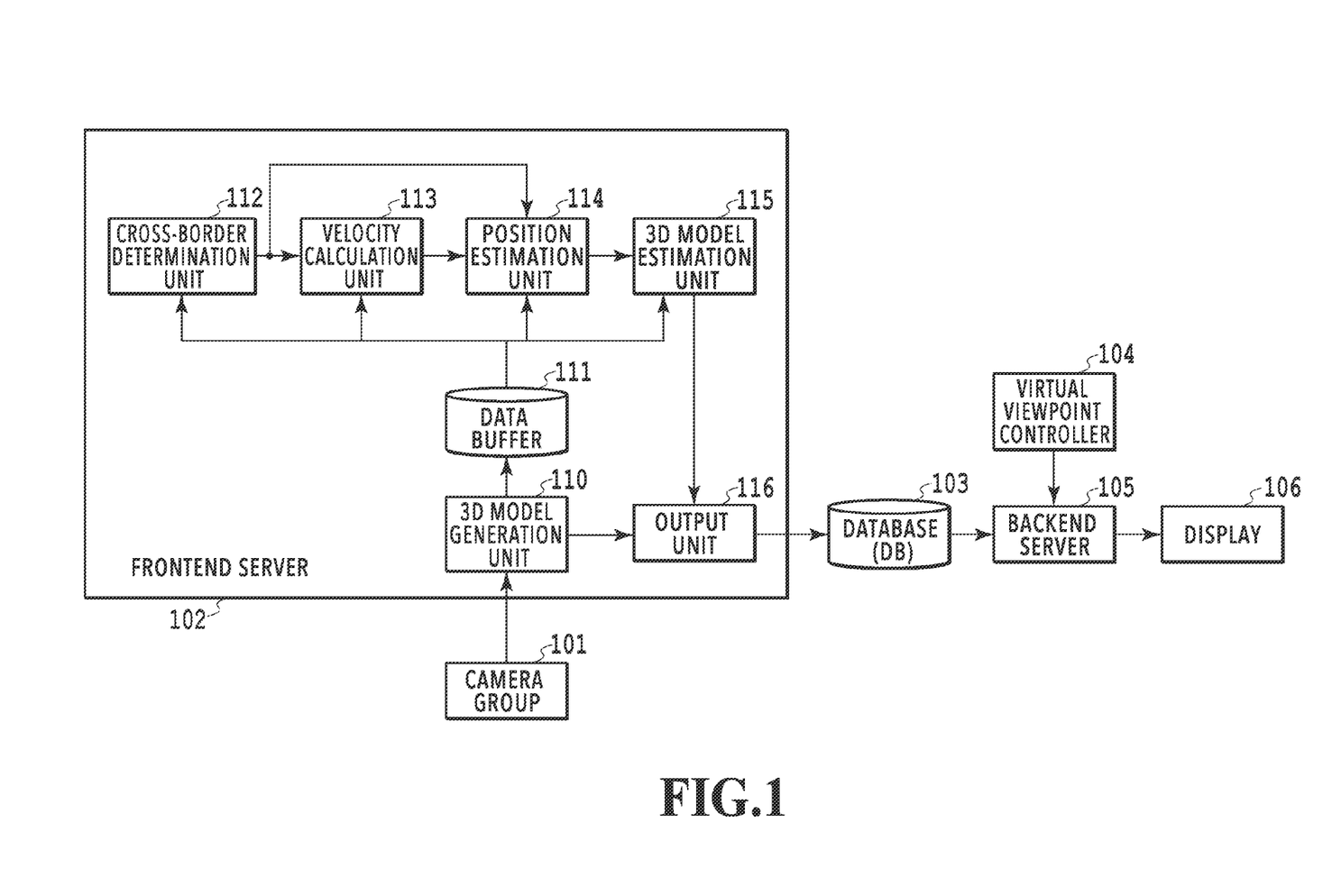
FIG. 1 is a diagram showing a configuration example of a virtual viewpoint image generation system.

FIG. 1 is a diagram showing a configuration example of a virtual viewpoint image generation system according to the present embodiment. A camera group 101 includes a plurality of imaging devices (cameras) and aims at the generation of data (generally called "3D model") representing a three-dimensional shape of an object and performs image capturing of a moving image with all the imaging devices being in synchronization. A plurality of moving images whose viewpoints are different, which is obtained by the plurality of cameras performing synchronous image capturing, is transmitted to a frontend server 102 in association with a time code indicating the image capturing time of each frame. In the following explanation, for convenience of explanation, the plurality of moving images whose viewpoints are different, which is obtained by the plurality of cameras performing synchronous image capturing, is generally called "camera image".

The frontend server 102 has a 3D model generation unit 110, a data buffer 111, a cross-border determination unit 112, a velocity calculation unit 113, a position estimation unit 114, a 3D model estimation unit 115, and an output unit 116.

Figure 2:
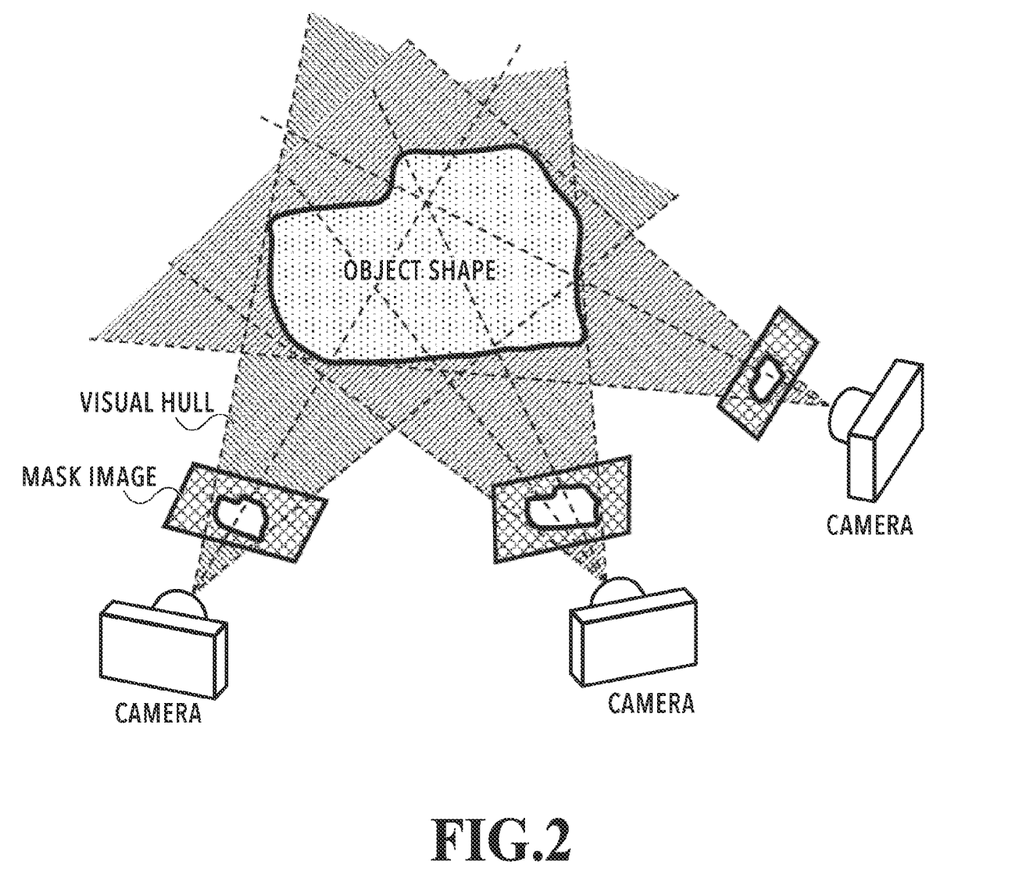
FIG. 2 is a diagram explaining a visual hull method.

The 3D model generation unit 110 generates a 3D model for each fame by, for example, the visual hull method by using camera images input from the camera group 101 for an object that moves, such as a person and a ball, which is captured in the camera images. FIG. 2 is a diagram explaining the visual hull method. The truncated pyramid (including those having an irregular shape) that spreads into a three-dimensional space from the image capturing center of the camera so as to pass through each point on the silhouette contour in the mask image (foreground silhouette image) is called "visual hull" of the camera. By fining the area common to the visual hulls by the plurality of cameras, the three-dimensional shape of the object is reproduced. In the present embodiment, a three-dimensional shape is represented by a set of a minute cubes called voxels. The generated 3D model is transmitted to a database 103 as well as being stored in the data buffer 111 in association with the time code of the corresponding frame.

The data buffer 111 stores the 3D model generated in the 3D model generation unit 110 in the time series order of the time code. The stored 3D model is provided to various types of image processing, such as cross-border determination, to be described later, velocity calculation, and 3D mode estimation. The data buffer 111 has a storage area large enough to store 3D models corresponding to the number of necessary frames for performing various pieces of image processing.

The cross-border determination unit 112 determines whether or not the object corresponding to the 3D model stored in the data buffer 111 has crossed the border of the preset 3D model generation area and gone out of the area. The 3D model generation area is a three-dimensional area (common image capturing area) in which the image capturing area of each of the plurality of cameras configuring the camera group 101 overlaps, which is set by an operator and the like checking that the area is covered by the number of cameras large enough to obtain a 3D model of predetermined quality. In a case where the determination results indicate that the object has gone out of the model generation area, the velocity calculation unit 113 is notified of the determination results as well as the time code of the frame immediately before the border is crossed (in the following, called "cross-border time information").

The velocity calculation unit 113 calculates the velocity vector at the time of the object going out of the 3D model generation area based on the cross-border time information notified by the cross-border determination unit 112. The calculation of the velocity vector is performed by identifying two or more frames at the point in time immediately before the border is crossed by referring to the cross-border time information and obtaining the 3D models corresponding to the two or more frames from the data buffer 111. The calculated velocity vector is sent to the position estimation unit 114 along with the cross-border time information.

The position estimation unit 114 obtains the positional information associated with the 3D model immediately before the border is crossed from the data buffer 111 based on the input cross-border time information and estimates the object position outside the 3D model generation area based on the input velocity vector. In the present embodiment, the position estimation unit 114 performs position estimation at predetermined intervals during the period of time from the point in time at which the target object goes out of the 3D model generation area to the point in time at which the target object returns again to within the 3D model generation area. The predetermine interval at this time is about 16.6 ms, for example, in a case where the frame rate at the time of the camera group 101 performing synchronous image capturing is 60 fps and the 3D model is generated for each frame. It is desirable for the interval at which position estimation is performed to be the interval at which position estimation is performed for each frame. However, in a case where the virtual viewpoint image is not displayed real time, it may also be possible for a user to set the interval at which position estimation is performed to an arbitrary interval, for example, such as one every several frames. Then, the one or more estimated object positions (estimated positions) are associated with the time code of the corresponding frame and sent to the 3D model estimation unit 115 along with the cross-border time information.

The 3D model estimation unit 115 estimates the 3D model of the object at each estimated position based on the results of the position estimation, which are input from the position estimation unit 114. It is possible to implement this estimation by duplicating the 3D model corresponding to the time code indicated by the cross-border time information and arranging the 3D model at the estimated position (the duplicated 3D model is associated with the time code of the frame corresponding to the estimated position). In the present embodiment, the 3D model estimation unit 115 performs the estimation of the 3D model at predetermined intervals during the period of time from the point in time at which the object goes out of the 3D model generation area to the point in time at which the object returns again to within the 3D model generation area. The predetermined interval in this case is the same as the predetermined interval at the time of the position estimation.

The output unit 116 associates the 3D model generated by the 3D model generation unit 110 and the 3D model estimated by the 3D model estimation unit 115 with the time code of the corresponding frame, respectively, and outputs them to the database 103.

The database 103 stores the 3D models received from the frontend server 102 in association with the time code of the corresponding frame, respectively.

A virtual viewpoint controller 104 is a control device for a user to set a virtual viewpoint by operating a virtual camera in an image capturing space in which the camera group 101 performs synchronous image capturing. The virtual viewpoint controller includes a display, a joystick, a keyboard and the like. For example, a user designates camera parameters, such as the position, orientation, and viewing angle, of the virtual camera by operating the joy stick on a user interface screen (UI screen) displaying a CG space reproducing the image capturing space. The camera parameters of the virtual camera designated by a user are associated with the corresponding time code and transmitted to a backend server 105 as virtual viewpoint information.

The backend server 105 obtains a 3D model from the database 103 based on the virtual viewpoint information received from the virtual viewpoint controller 104 and generates a virtual viewpoint image in accordance with the designated position, orientation, and viewing angle of the virtual camera. The generated virtual viewpoint image is transmitted to a display 106 and displayed on the display 106. The output destination of the virtual viewpoint image does not necessarily need to be the display. For example, a configuration may also be accepted in which a virtual viewpoint image is transmitted to a distributor, not shown schematically, and the virtual viewpoint image is made available to the public on a Web by the distributor.

<Hardware Configuration>

Figure 3:
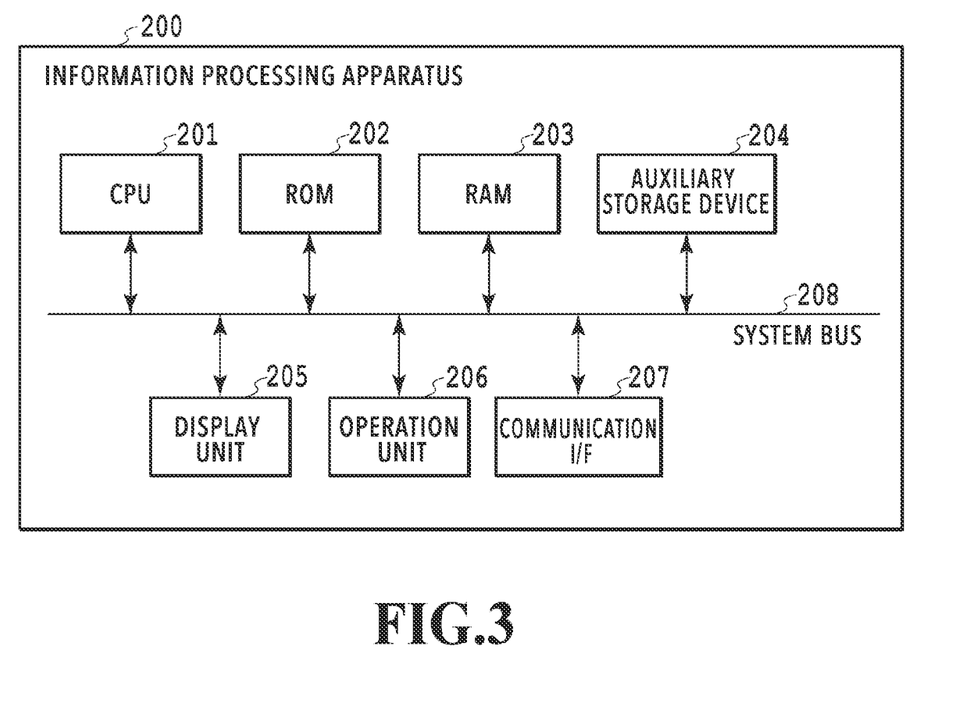
FIG. 3 is a diagram showing a hardware configuration example of various devices configuring a virtual viewpoint image generation system.

FIG. 3 is a diagram showing a hardware configuration example of various devices configuring the virtual viewpoint image generation system. That is, the frontend server 102, the database 103, the virtual viewpoint controller 104, and the backend server 105 may be implemented by an information processing apparatus 200 shown in FIG. 3. The information processing apparatus 200 has a CPU 201, a ROM 202, a RAM 203, an auxiliary storage device 204, a display unit 205, an operation unit 206, a communication I/F 207, and a system bus 208.

The CPU 201 implements each function of the virtual viewpoint image generation system shown in FIG. 1 by controlling the entire information processing apparatus 200 by using computer programs and data stored in the ROM 202 and the RAM 203. It may also be possible for the information processing apparatus 200 to have one or a plurality of pieces of dedicated hardware different from the CPU 201 and at least part of the processing that is performed by the CPU 201 may be performed by the dedicated hardware. As examples of the dedicated hardware such as this, there are an ASIC (Application Specific Integrated Circuit), an FPGA (Field Programable Gate Array), a DSP (Digital Signal Processor) and the like.

The ROM 202 stores programs and the like that do not need to be changed. The RAM 203 temporarily stores programs and data supplied from the auxiliary storage device 204, data supplied from the outside via the communication I/F 207, and the like. The auxiliary storage device 204 includes, for example, a hard disk drive and the like and stores various types of data, such as image data and acoustic data.

The display unit 205 includes, for example, a liquid crystal display and an LED and displays a GUI (Graphical User Interface) for a user to give instructions to the information processing apparatus 200, and the like. The operation unit 206 includes, for example, a keyboard, a mouse, a joystick, a touch panel and the like and inputs various instructions to the CPU 201 upon receipt of the operation by a user. The CPU 201 operates as a display control unit configured to control the display unit 205 and an operation control unit configured to control the operation unit 206.

The communication I/F 207 is used for the communication with an external device of the information processing apparatus 200, such as the camera group 101 and a microphone group, not shown schematically. In a case where the information processing apparatus 200 has a function to wirelessly communicate with an external device, the communication I/F 207 comprises an antenna. The system bus 208 connects each unit of the information processing apparatus 200 and transmits information.

In the configuration example shown in FIG. 3, the display unit 205 and the operation unit 206 exist inside the information processing apparatus 200, but at least one of the display unit 205 and the operation unit 206 may exist outside the information processing apparatus 200 as another device.

<3D Model Generation Processing in Frontend Server 102>

Figure 4:
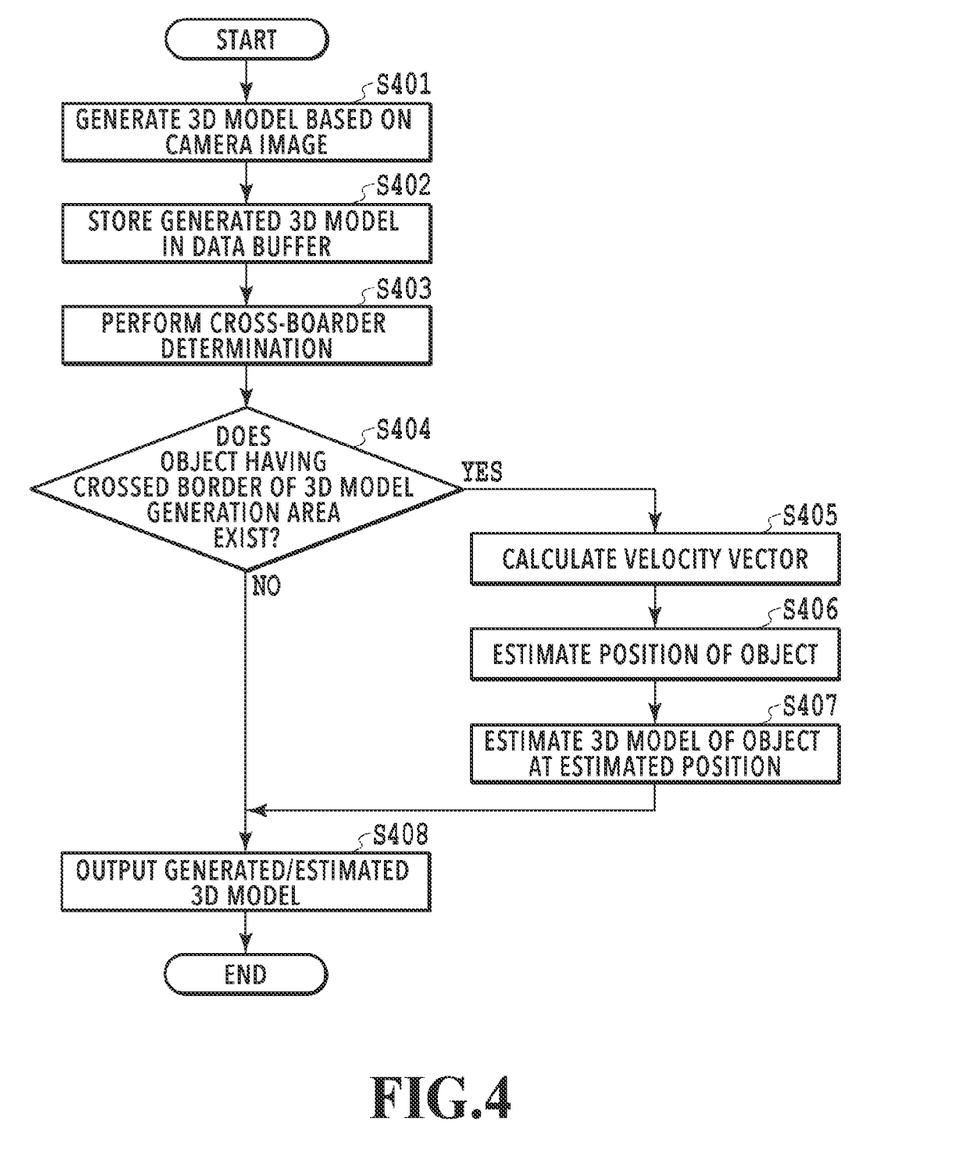
FIG. 4 is a flowchart showing a flow of 3D model generation processing in a frontend server.

FIG. 4 is a flowchart showing a flow of processing for the frontend server 102 to generate a 3D model of an object. As described above, even in a case where an object goes out of the 3D model generation area, the frontend server 102 of the present embodiment estimates the object position after that and generates a 3D model at the estimated position. In the following, explanation is given along the flow in FIG. 4. In the following explanation, a symbol "S" means a step.

Figure 5A:
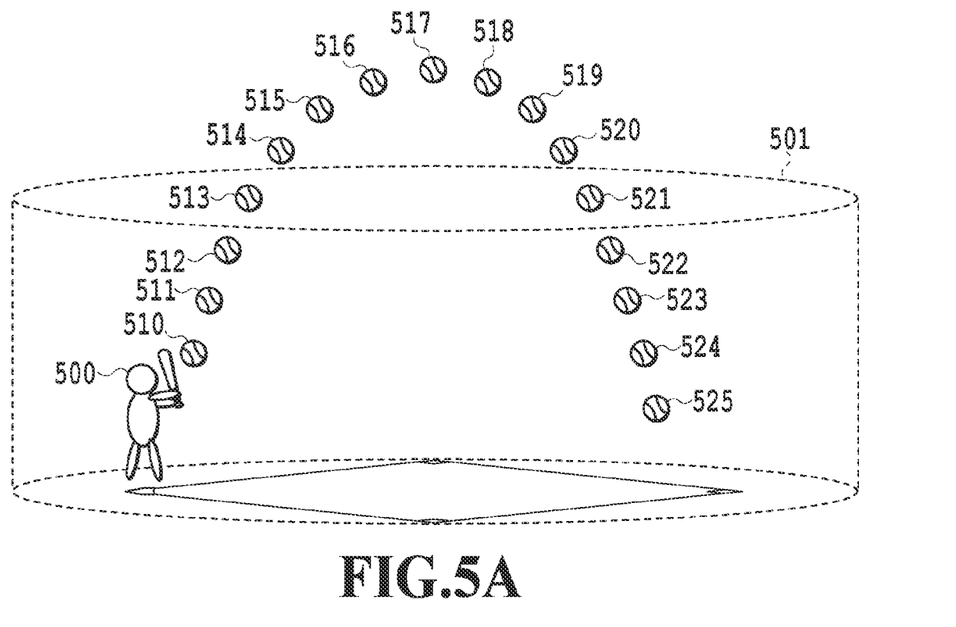
FIG. 5A and FIG. 5B are each a diagram showing in time series the way a ball hit by a batter returns to within a 3D model generation area again after going out of the 3D model generation area.

At S401, the 3D model generation unit 110 generates a 3D model of an object by using the visual hull method based on the camera image input from the camera group 101. Here, it is assumed that a 3D model of each object existing within the 3D model generation area set in advance is generated for each frame configuring the camera image. Here, a specific example is shown. FIG. 5A is a diagram showing in a time series the way a ball hit by a batter 500 that once goes out of a 3D model generation area 501 returns to within the 3D model generation area 501 again in a case where the image capturing-target event is a game of baseball. In FIG. 5A, ball marks 510 to 525 indicate the locus of the ball from the time immediately after the batter 500 hits the ball and represent the position and orientation of the ball in each frame. Here, within the 3D model generation area 501, the batter and the ball exist and the 3D models of them are generated. Further, to the generated 3D model, positional information is attached. The positional information in this case is represented in the world coordinate system and given as three-dimensional coordinates (x, y, z) in a case where the ground in the image capturing-target real space is represented by the X-axis and the Y-axis and the vertical direction is represented by the Z-axis. To each 3D model corresponding to the ball marks 510 to 512 and 522 to 525 in FIG. 5A, positional information as shown in Table 1 below is attached.

TABLE 1

| | Positional information (x, y, z) |
|---|---|
| ball mark 510 | (10, 10, 3) |
| ball mark 511 | (20, 20, 4.3) |
| ball mark 512 | (30, 30, 5.4) |
| ball mark 522 | (130, 130, 5.4) |
| ball mark 523 | (140, 140, 4.3) |
| ball mark 524 | (150, 150, 3) |
| ball mark 525 | (160, 160, 1.5) |

At S402, the 3D model of each frame, which is generated for each object at S401, is stored in the data buffer in a time series in association with the time code of the corresponding frame. In the example in FIG. 5A described previously, at this point in time, for the batter, the 3D model for all the frames is obtained and for the ball, the 3D models corresponding to the ball mark 510 to 512 and 522 to 525 are obtained. Then, those 3D models are stored in the data buffer 111 in association with the time code of the frame corresponding to each 3D model.

At S403, the cross-border determination unit 112 determines whether or not each object whose 3D model is generated at S401 has gone out of the 3D model generation area. The determination method is not limited particularly and for example, it may be possible to perform the determination by the following method. First, based on the 3D model of the object of interest, which is stored in the data buffer 111 in a time series, the locus of the three-dimensional position thereof is found and from the obtained locus, the timing at which the object of interest crosses the border of the 3D model generation area is predicted. Then, in a case where the predicted timing matches with the timing at which the 3D model of the object of interest has disappeared from the data buffer 111, it is determined that the object of interest has gone out of the 3D model generation area. A case where it is determined that only part of the object exists within the 3D model generation area (case where 3D model representing the three-dimensional shape of part of the object exists in the data buffer 111) may be handled, for example, as follows. That is, in this case, the 3D model (partial 3D model) part of the shape of which is missing is generated. Consequently, in a case where it is possible to identify that the partial 3D model relates to the same object of the 3D model of the previous frame, it is not determined that the object of interest has gone out of the 3D model generation area. On the other hand, in a case where it is not possible to identify that the partial 3D model relates to the same object of the 3D model of the previous frame, it is determined that the object of interest has gone out of the 3D model generation area. In the example in FIG. 5A described previously, the ball marks 510 to 512 are inside the 3D model generation area 501, and therefore, the 3D model without missing part in each corresponding frame is stored in the data buffer 111. On the other hand, the ball mark 513 is outside the 3D model generation area 501, and therefore, in the data buffer 111, the corresponding 3D model is not stored. Here, based on the locus of the positions of the ball marks 510 to 512, it has been predicted that the timing at which the ball crosses the boarder of the 3D model generation area 501 is the timing at which the ball reaches the position of the ball mark 513. Then, at the predicted timing, the 3D model of the ball disappears from the data buffer 111, and therefore, it is determined that the ball has gone out of the 3D model generation area 501. In this case, the time code of the frame immediately before the ball crosses the border, for example, the time codes for two frames corresponding to the ball mark 512 and the ball mark 511 are sent to the velocity calculation unit 113 and the position estimation unit 114 as cross-boarder time information.

At S404, the processing is branched in accordance with the results of the determination at S403. Specifically, in a case where the object having gone out of the 3D model generation area exists, S405 is performed continuously. On the other hand, in a case where the object having gone out of the 3D model generation area does not exist, this processing is terminated.

At S405, based on the cross-boarder time information input from the cross-border determination unit 112, the velocity calculation unit 113 calculates the velocity vector based on the locus of the movement of the target object until the boarder is crossed at the point in time immediately before the target object crosses the boarder. In the example in FIG. 5A described previously, the velocity vector in a case where the ball is located at the position of the ball mark 512 is calculated as follows based on the 3D models of the two frames corresponding to the ball marks 512 and 511. Here, the coordinates of the position indicated by the ball mark 512 in the frame immediately before the ball crosses the border are taken to be (x1, y1, z1) and the coordinates of the position indicated by the ball mark 511 in the one previous frame are taken to be (x2, y2, z2). Here, the home base in FIG. 5A is taken to be the origin (0, 0, 0), the line connecting the home base and the first base is taken to be the X-axis (positive direction is the direction toward the first base), the line connecting the home base and the third based is taken to be the Y-axis (positive direction is the direction toward the third base), and the vertical direction is taken to be the Z-axis (positive direction is the direction toward the sky). At this time, a velocity vector v (m/s) to be found is expressed by the following formula.

velocity vector $v=((x1-x2)/\Delta t, (y1-y2)/\Delta t, (z1-z2)/\Delta t)$   formula (1)

In formula (1) described above, $\Delta t$ represents the time taken for the frame to move to the next frame. In this manner, a velocity vector $V_{512}=(10, 10, 1.1)$ at the ball mark 512 with the center of the ball mark 512 being taken as the origin is obtained. The method of finding the locus of the movement of an object is not limited particularly, and as one example, there is a method in which the center of gravity of each 3D model is identified from the three-dimensional shape represented by the 3D model and the locus of the identified center of gravity is taken as the locus of the 3D model. The velocity vector thus calculated is input to the position estimation unit 114.

At S406, the position estimation unit 114 estimates the three-dimensional position of the object outside the 3D model generation area based on the cross-border time information that is input from the cross-border determination unit 112 and the velocity vector that is input from the velocity calculation unit 113. In the example in FIG. 5A described previously, first, the information on the three-dimensional position of the ball mark 512 is obtained from the 3D model associated with the time code indicated by the cross-boarder time information. Then, based on the obtained three-dimensional position (x, y, z)=(30, 30, 5.4) and the velocity vector $V_{512}=(10, 10, 1.1)$ calculated at S405, the position of the ball corresponding to each frame outside the 3D model generation area is estimated. Due to this, in the example in FIG. 5A described previously, the estimated positions corresponding to each of the ball marks 513 to 521 as shown in Table 2 below are obtained.

TABLE 2

| | Positional information (x, y, z) |
|---|---|
| ball mark 513 | (40, 40, 6.3) |
| ball mark 514 | (50, 50, 7) |
| ball mark 515 | (60, 60, 7.5) |
| ball mark 516 | (70, 70, 7.8) |
| ball mark 517 | (80, 80, 7.9) |
| ball mark 518 | (90, 90, 7.8) |
| ball mark 519 | (100, 100, 7.5) |
| ball mark 520 | (110, 110, 7) |
| ball mark 521 | (120, 120, 6.3) |

The method of position estimation is not limited particularly, and as one example, there is a method of estimating the position from a quadratic curve that is found from the position of the ball mark 512 immediately before the border is crossed, the velocity vector thereof, and the acceleration of gravity. Further, it may also be possible to perform estimation by taking into consideration the velocity of the wind. Alternatively, machine learning taking many actual values in the similar scene as training data is performed and the position estimation may be performed by using the obtained trained model. Each estimated position is associated with the time code of each corresponding frame and input to the 3D model estimation unit 115.

At S407, the 3D model estimation unit 115 estimates the 3D model at each position estimated for the target object based on the results of the position estimation, which are input from the position estimation unit 114. Specifically, processing to arrange the duplicate of the 3D model corresponding to the time code of the frame immediately before the boarder is crossed at each estimated position is performed. In the example in FIG. 5A described previously, the duplicate of the 3D model corresponding to the ball mark 512 is arranged at all the positions estimated for each frame at S406. In the arrangement of the 3D model at the estimated three-dimensional position, it is sufficient to find the center of gravity of the 3D model at the point in time immediately before the border is crossed and arrange the 3D model so that the found center of gravity matches with the estimated position. In this manner, the 3D model corresponding to each of the ball marks 513 to 521 is obtained as estimation results in FIG. 5A described previously.

At S408, the output unit 116 outputs all the 3D models generated at S402 and all the 3D models estimated at S407 in association with the time codes of each corresponding frame. At this time, the association of the estimated 3D model with the time code is performed based on the time code associated with the estimated position. In the present embodiment, all the 3D models are transmitted to the database 103 and stored in the database 103.

The above is the contents of the 3D model generation processing in the frontend server 102. Explanation is given by taking the case as an example where the camera image whose image capturing is already completed and which is stored in advance is input and processed, but it may also be possible to sequentially input and process images being captured real time.

Modification Example 1

In a case where the 3D model immediately before the object goes out of the 3D model generation area is duplicated and arranged at the estimated position as it is, the orientation of all the arranged duplicated 3D models is the same as that of the original 3D model. In this case, provided that the position of the set virtual viewpoint is distant from the object, there is no problem, but provided that the position is close to the object, there arises a problem. For example, in the above-described example of the ball, in a case where the orientation of all the 3D models arranged at each estimated position is the same, the ball that is displayed large on the virtual viewpoint image is displayed with no rotation, and therefore, a sense of incongruity is given to a viewer. Particularly, in a case where the shape is not a true sphere, such as a rugby ball, the sense of incongruity of a viewer becomes larger. Further, by a ball flying while rotating, the influence of air changes, and therefore, the locus of movement changes depending on the angular velocity. Consequently, it may also be possible to find a angular velocity vector (vector indicating the rotation axis direction with the absolute value of angular velocity ω as its magnitude) based on the time code of the 3D model immediately before the object goes out of the 3D model generation area and arrange the 3D model at the estimated position by also taking into consideration the orientation of the object.

In the case of the present modification example, the velocity calculation unit 113 also calculates the angular velocity vector, in addition to the velocity vector of the 3D model immediately before the object goes out of the 3D model generation area. The calculation of the angular velocity vector is also performed based on the 3D models of two or more frames stored in the data buffer 111. In the case of the example in FIG. 5A described previously, based on the rotation locus of the ball marks 510 to 512, an angular velocity vector ω 512 at the time of the ball going out of the 3D model generation area (ball mark 512) is calculated. The calculation method of the angular velocity vector is not limited particularly, and for example, by extracting feature points of the center of gravity and portions other than the center of gravity from the shape of the 3D model and finding the rotation angle of the feature point with the center of gravity as the center, the angular velocity vector is calculated. Here, in a case where the angular velocity vector ω 512 is taken to be (ωx, ωy, ωz), ωx takes the rotation direction in a case where a right-handed screw is rotated so that the screw moves in the direction toward the first base around the line connecting the home base and the first base as the rotation axis as the positive direction. Similarly, ωy takes the rotation direction in a case where a right-handed screw is rotated so that the screw moves in the direction toward the third base around the line connecting the home base and the third base as the rotation axis as the positive direction. Similarly, ωz takes the rotation direction in a case where a right-handed screw is rotated so that the screw moves in the direction toward the sky around the vertical direction as the rotation axis as the positive direction. Each component of the velocity vector indicates angular velocity (rad/sec). In this case, depending on the relationship between the rotation velocity of the object and the frame rate, there is a possibility that erroneous calculation is performed in the rotation in the direction opposite to the direction of the actual rotation. Consequently, it may also be possible to separately provide a determination unit configured to determine whether or not the rotation direction indicated by the calculated angular velocity vector is correct by identifying the rotation direction of the object based on the camera image captured at a frame rate higher than that of the camera image for generating a 3D model. The calculated angular velocity vector is input to the position estimation unit 114 along with the velocity vector.

Then, the position estimation unit 114 of the present modification example performs the position estimation of the object based on the velocity vector and the angular velocity vector input from the velocity calculation unit 113. Specifically, first, the position estimation unit 114 reads the 3D model at the point in time immediately before the boarder is crossed from the data buffer 111 and obtains the position and orientation thereof. Then, based on the obtained position of the 3D model and the input velocity vector and the angular velocity vector, the position estimation unit 114 estimates all the positions of the ball (ball marks 513 to 521) outside the 3D model generation area. At this time, it may also be possible to correct the estimated position by calculating the lift that is found from the angular velocity vector for a quadratic curve that is found from the position, the velocity vector, and the acceleration of gravity at the time (ball mark 512) of the ball going out of the 3D model generation area. The position thus estimated is input to the 3D model estimation unit 115.

Figure 5B:
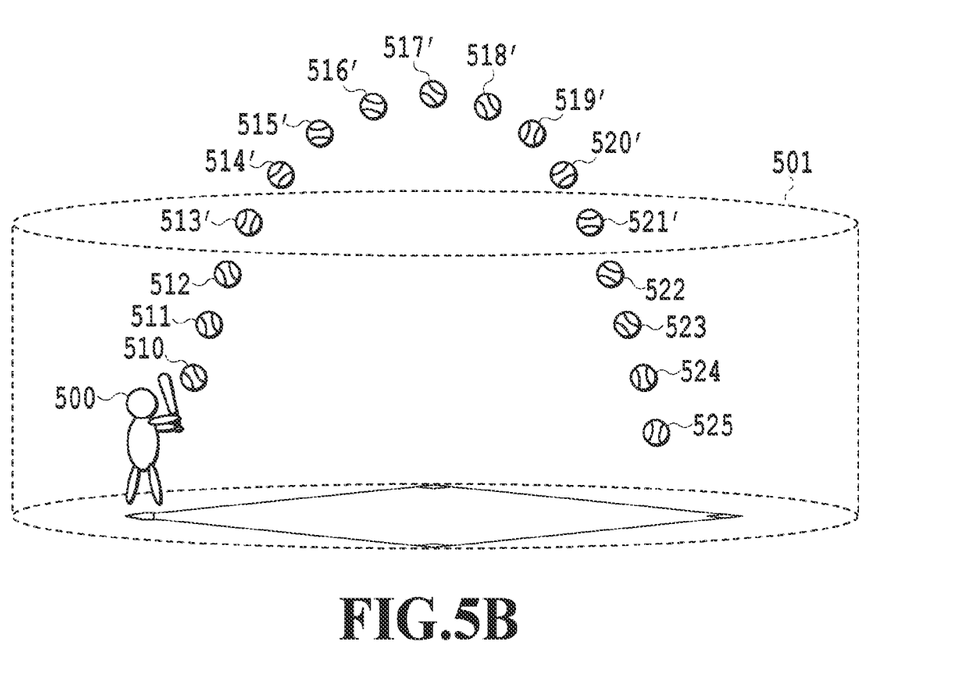

The 3D model estimation unit 115 performs duplication and arrangement of the 3D model for the input estimated position. At this time, the 3D model estimation unit 115 arranges the 3D model at each estimated position after correcting the orientation of the duplicated 3D model based on the input angular velocity vector. The method of correcting the orientation is not limited particularly and for example, it is considered to determine and correct the orientation of the 3D model at each estimated position on the assumption that the 3D model continues to rotate in accordance with the calculated angular velocity vector. Due to this, as shown in FIG. 5B, for example, 3D models corresponding to ball marks 513' to 521' are obtained, which are arranged after the orientation of the duplicate of the 3D model corresponding to the ball mark 512 is corrected. Compared to FIG. 5A, it can be seen that the rotation of the ball is taken into consideration in FIG. 5B.

As above, it may also be possible to correct the estimated position based on the angular velocity vector, correct the orientation of the 3D model that is arranged at the estimated position, and so on, by calculating the angular velocity vector, not the velocity vector alone. Due to this, even in a case where the virtual viewpoint comes close to the object, such as the ball, it is made possible to obtain a virtual viewpoint image giving a small sense of incongruity.

Modification Example 2

Further, in the above-described embodiment, the position estimation is performed by using only the velocity vector at the time of the object going out of the 3D model generation area, but this is not limited. In a case where the object returns again to within the 3D model generation area, it may also be possible to perform the position estimation by further finding the velocity vector at the time of return and using both the velocity vectors at the time of going out and at the time of return. In this case, it is sufficient to perform position estimation on the assumption that the vector moves linearly from a velocity vector Vout at the time of going out to a velocity vector Vin at the time of return. Further, similarly in the modification example 1 described above, it may also be possible to calculate the angular velocity vector at the time of the object returning again to within the 3D model generation area and utilize the angular velocity vector for the position estimation and the estimation of the 3D model for the estimated position. That is, in the example in FIG. 5B described previously, it may also be possible to correct the estimated positions corresponding to the ball marks 513' to 521' and the orientation of the 3D model to be arranged based on the velocity vector, the angular velocity vector, the position, and the orientation of the ball (ball mark 522) at the time of retuning to within the area. Further, in a case where the input camera image is the camera image whose image capturing is already completed and which is stored in advance, it may also be possible to duplicate the 3D model generated immediately after the object returns again within to the 3D model generation area and arrange the duplicated 3D model at the estimated position. In the example in FIG. 5A and FIG. 5B, after going out of the 3D model generation area, the ball as the object returns again to within the area by a natural falling motion describing a smooth parabola as the locus thereof. However, the object that once goes out of the 3D model generation area returns again to within the area by a natural falling motion is not the indispensable requirement for the application of the present embodiment. It is possible to apply the present embodiment to, for example, even a case where the ball goes out of the field and disappears or a case where the locus of the ball changes because of the collision of the ball with an obstacle. In this case, additional processing, for example, such as processing to discard the estimated 3D model, is performed prior to S408 and the output unit 116 does not output the 3D model obtained by estimation. Whether or not the ball goes out of the field and disappears may be determined based on, for example, whether the object returns to within the 3D model generation area within a predetermined time. Further, whether or not the object hits an obstacle and the locus of the object changes may be determined based on the three-dimensional position and orientation of the object at the point in time at which the object returns to within the 3D model generation area. For example, in the example in FIG. 5A described previously, in a case where the position and orientation of the ball at the time of returning to within the 3D model generation area are shifted more than a threshold value set in advance, it may be possible to determine that the locus has changed by the ball hitting an obstacle, not by the influence of air resistance or wind. Such a configuration may be accepted in which it is possible for a user to select whether the 3D model is necessary or not via a UI screen or the like in place of discarding the estimated 3D model in a case where the object goes out of the field and disappears or in a case where the object hits an obstacle and the locus of the object changes.

Modification Example 3

Figure 6A:
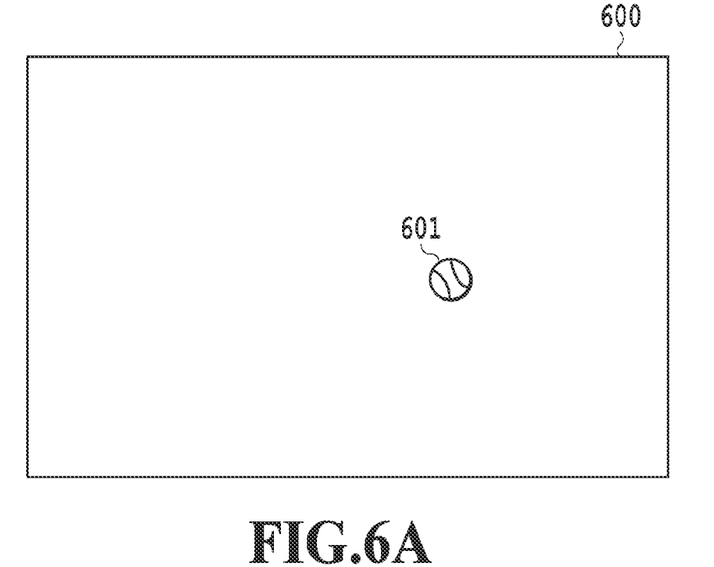
FIG. 6A and FIG. 6B are each an explanatory diagram of modification example 3.
Figure 6B:
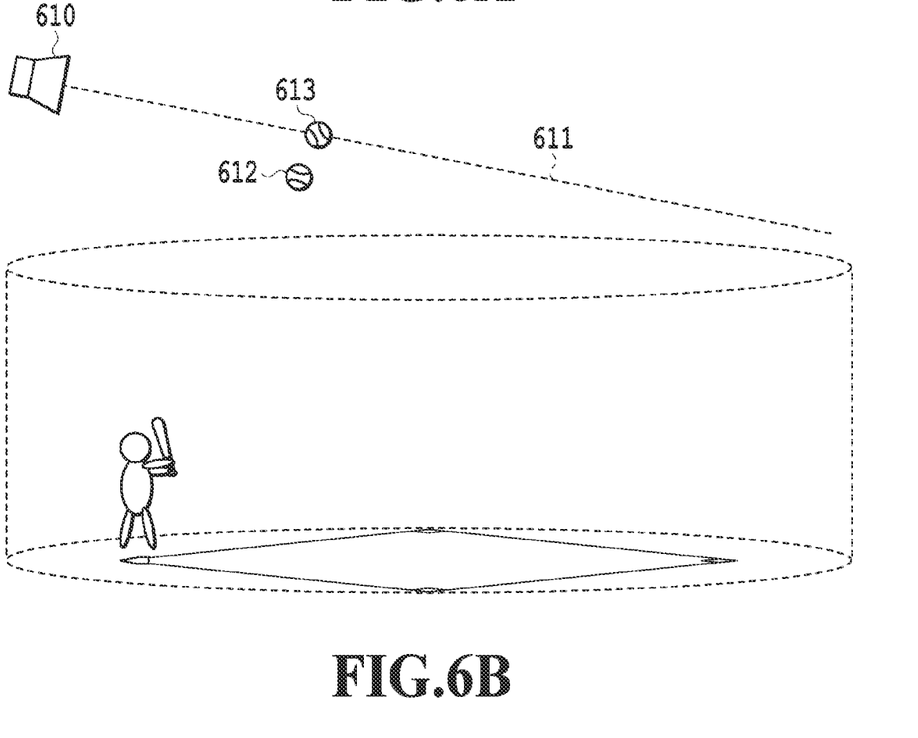

For the object existing within the viewing angle of the camera, it is also possible to correct the estimated position and the orientation of the 3D model to be arranged based on the captured image. The captured image in this case may be the image captured by one of the cameras configuring the camera group 101 or may be the image captured by another camera not included in the camera group 101. Explanation is given with reference to FIG. 6A and FIG. 6B. First, from the position and orientation of the camera corresponding to an arbitrary captured image, candidates of the object position are found. Here, the candidates of the object position are represented by a straight line on the virtual space. A captured image 600 shown in FIG. 6A is an image obtained by a camera 610 shown in FIG. 6B performing image capturing and in the captured image 600, a ball indicated by a ball mark 611 is captured. In FIG. 6B, a broken straight line 611 extending from the camera 610 indicates candidates of the position of the ball on the virtual space, which are estimated based on the position of the ball mark 601. That is, the ball exists at some position on the straight line 611. In a case where there is a deviation between the straight line representing the candidates of the object position, which is obtained as above, and the estimated position, the estimated position is corrected to the position on the straight line, which is the closest to the estimated position. In FIG. 6B, a ball mark 612 indicates the estimated position and the orientation of the 3D model to be arranged at the estimated position and it can be seen that there is a deviation in position from the straight line 11. In this case, the estimated position is corrected to the position on the straight line 611, which is the closest to the estimated position, and at the same time, the orientation of the 3D model at the corrected estimated position in a case of being viewed from the camera 610 is corrected so that the orientation matches the orientation indicated by the ball mark 601. Due to this, the position and orientation of the 3D model corresponding to the ball mark 612 are corrected to the position and orientation as shown by a ball mark 613.

In the example described above, the case is explained where correction is performed by using one captured image, but in a case where two or more captured images obtained by a plurality of cameras performing image capturing are used, from the positions and orientations of the plurality of cameras corresponding thereto, the position of the object is identified. Then, in a case where there is a deviation between the identified object position and the estimated position, the position of the 3D model is corrected to the identified object position. Further, the orientation of the 3D model at the corrected estimated position in a case of being viewed from each of the plurality of cameras is corrected so as to match the orientation of the object in each captured image. As described above, although limited to the case where the target object exists within the viewing angle of the camera, it may also be possible to correct the estimated position and the orientation of the 3D model to be arranged based on the captured image.

As described above, in the present embodiment, in a case where the object goes out of the 3D model generation area, the position of the object outside the area is estimated based on the velocity vector immediately before the object goes out of the 3D model generation area and the 3D model in a case where the object exists within the area is duplicated and arranged. Due to this, even in a case where the object goes out of the 3D model generation area, it is possible to continuously supply the 3D model and prevent the object from disappearing suddenly in the virtual viewpoint image.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, even in a case where an object goes out of a 3D model generation area, it is possible to continuously generate the 3D model.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-176766, filed Nov. 2, 2022 which is hereby incorporated by reference wherein in its entirety.

What is claimed is:

1. A generation apparatus comprising:
one or more memories storing instructions; and
one or more processors executing the instructions to perform:
    generating a 3D model representing a three-dimensional shape of an object existing in an area in which image capturing areas of a plurality of imaging devices overlap by using a plurality of moving images obtained by the plurality of imaging devices capturing images of the object;
    calculating, in a case where the object corresponding to the generated 3D model goes out of the area, a first velocity vector at the time of the object crossing a border of the area;
    estimating a position of the object after the object goes out of the area based on the calculated first velocity vector and a position at the time of the object crossing the border of the area; and
    estimating a 3D model representing a three-dimensional shape of the object at the estimated position by associating a duplicate of the generated 3D model with the estimated position, wherein in the estimating the position, a position of the object is estimated during a period of time from the object going out of the area until the object returning to the area.

2. The generation apparatus according to claim 1, wherein
in the calculating, a first angular velocity vector at the time of the object crossing the border of the area is further calculated and
in the estimating the 3D model, determining an orientation of the duplicated 3D model based on assumption that the object continues to rotate in accordance with the calculated first angular velocity vector, and thereby the duplicate of the generated 3D model is associated with the estimated position.

3. The generation apparatus according to claim 2, wherein
in the estimating the 3D model:
    based on the calculated first angular velocity vector, the estimated position is corrected; and
    the duplicate of a generated 3D model representing a last three-dimensional shape generated before the object goes out of the area is associated with the corrected position.

4. The generation apparatus according to claim 1, wherein
in the calculating, a second velocity vector at the time of the object having gone out of the area returning to within the area is further found and
in the estimating the position, a position of the object is estimated based on the calculated first velocity vector and the second velocity vector.

5. The generation apparatus according to claim 4, wherein
in the calculating, a second angular velocity vector at the time of the object having gone out of the area returning to within the area is further found and
in the estimating the 3D model:
    based on the calculated second angular velocity vector, the estimated position is corrected; and
    a duplicated 3D model corresponding to a last 3D model generated before the object goes out of the area is associated with the corrected position.

6. The generation apparatus according to claim 1, wherein
in the estimating the 3D model:
    based on images of the object captured by one or more imaging devices, the estimated position is corrected; and
    a duplicate of a last 3D model generated before the object goes out of the area is associated with the corrected position.

7. The generation apparatus according to claim 6, wherein
in the estimating the 3D model:
    based on a position of the object captured in the images of the object captured by the one or more imaging devices, a candidate of the position of the object on the virtual space is calculated; and
    in a case where there is a deviation between the calculated candidate of the position and the estimated position, the estimated position is corrected to a position the closest to the candidate of the position.

8. The generation apparatus according to claim 7, wherein
in the estimating the 3D model, the orientation of the 3D model that is associated with the corrected position is corrected so as to match the orientation of the object in the images of the object captured by the one or more imaging devices.

9. The generation apparatus according to claim 1, wherein
the one or more processors execute the instructions to perform:
    determining whether or not the object corresponding to the generated 3D model has gone out of the area and
in a case where it is determined that the object has gone out of the area, the first velocity vector is calculated.

10. The generation apparatus according to claim 9, wherein
the one or more memories execute the instructions to perform:
    storing the generated 3D model in the memory and
in the determining:
    from a locus of the position of the 3D model stored in a time series, timing at which the 3D model crosses the boarder of the area is predicted; and
    in a case where the predicted timing matches timing at which the 3D model disappears from the memory, it is determined that the object has gone out of the area.

11. The generation apparatus according to claim 1, wherein in the generating, the 3D model is generated for each frame configuring the plurality of images, in the estimating the position, the position of the object after going out of the area is estimated for each frame configuring the plurality of images, and in the estimating the 3D model, the 3D model representing a three-dimensional shape of the object at each position estimated for each frame.

12. The generation apparatus according to claim 1, wherein in the estimating the 3D model, a duplicate of a last 3D model generated before the object goes out of the area is associated.

13. The generation apparatus according to claim 1, wherein the one or more processors execute the instructions to perform:

outputting the generated 3D model and the estimated 3D model.

14. The generation apparatus according to claim 13, wherein in the outputting, in a case where the object determined to have gone out of the area does not return to within the area, or in a case where the object returns to within the area but the locus of the object has changed, the estimated 3D model is not output.

15. A generation method comprising the steps of:

generating a 3D model representing a three-dimensional shape of an object existing in an area in which image capturing areas of a plurality of imaging devices overlap by using a plurality of moving images obtained by the plurality of imaging devices capturing images of the object;

calculating, in a case where the object corresponding to the generated 3D model goes out of the area, a first velocity vector at the time of the object crossing a border of the area;

estimating a position of the object after the object goes out of the area based on the calculated first velocity vector and a position at the time of the object crossing the border of the area; and estimating a 3D model representing a three-dimensional shape of the object at the estimated position by associating a duplicate of the generated 3D model with the estimated position, wherein in the estimating the position, a position of the object is estimated during a period of time from the object going out of the area until the object returning to the area.

16. A non-transitory computer readable storage medium storing a program for causing a computer to perform a generation method comprising the steps of:

generating a 3D model representing a three-dimensional shape of an object existing in an area in which image capturing areas of a plurality of imaging devices overlap by using a plurality of moving images obtained by the plurality of imaging devices capturing images of the object;

calculating, in a case where the object corresponding to the generated 3D model goes out of the area, a first velocity vector at the time of the object crossing a border of the area;

estimating a position of the object after the object goes out of the area based on the calculated first velocity vector and a position at the time of the object crossing the border of the area; and estimating a 3D model representing a three-dimensional shape of the object at the estimated position by associating a duplicate of the generated 3D model with the estimated position, wherein in the estimating the position, a position of the object is estimated during a period of time from the object going out of the area until the object returning to the area.

* * * * *